United States Patent [19]

Kirikae et al.

[11] 4,209,919
[45] Jul. 1, 1980

[54] MODEL OF LIVING BODY

[75] Inventors: Ichiro Kirikae, Mitaka; Taichiro Akiyama, 2-19-23, Shimoochiai, Shinjuku-ku, Tokyo, both of Japan

[73] Assignee: Taichiro Akiyama, Tokyo, Japan

[21] Appl. No.: 925,280

[22] Filed: Jul. 17, 1978

[30] Foreign Application Priority Data

Jul. 23, 1977 [JP] Japan ................................ 52/98566

[51] Int. Cl.² ............................................. G09B 23/34
[52] U.S. Cl. ......................................................... 35/17
[58] Field of Search .................. 32/71; 35/17; 46/164, 46/171; 3/36

[56] References Cited

U.S. PATENT DOCUMENTS

| 2,034,446 | 3/1936 | Saxe | 35/17 |
| 2,261,328 | 11/1941 | Baum | 46/164 |
| 2,778,125 | 1/1957 | Hantman | 35/17 |
| 3,213,550 | 10/1965 | Kittner | 35/17 |
| 3,520,071 | 7/1970 | Abrahamson | 35/17 |
| 3,916,535 | 11/1975 | Hewson | 35/17 |
| 3,931,679 | 1/1976 | Carter | 35/17 X |

OTHER PUBLICATIONS

"Human Ear Models", p. 295 of 1968 Cenco Educational Catalog.
C. K. Adams et al, "Lump Detection in Simulated Human Breasts", pp. 163–167 of Perception and Psychophysics Magazine 1976, vol. 20 (3).

Primary Examiner—Harland S. Skogquist
Attorney, Agent, or Firm—McDougall, Hersh & Scott

[57] ABSTRACT

A model of a living body includes a cranium as a main body; and organ components (tongue portion and ear portion) made of yieldable material, arranged on the main body, wherein an external force is applied to one of the organ components from the external of the main body to deform the organ component, and thereby the inside of the organ component can be observed from the external of the main body.

5 Claims, 7 Drawing Figures

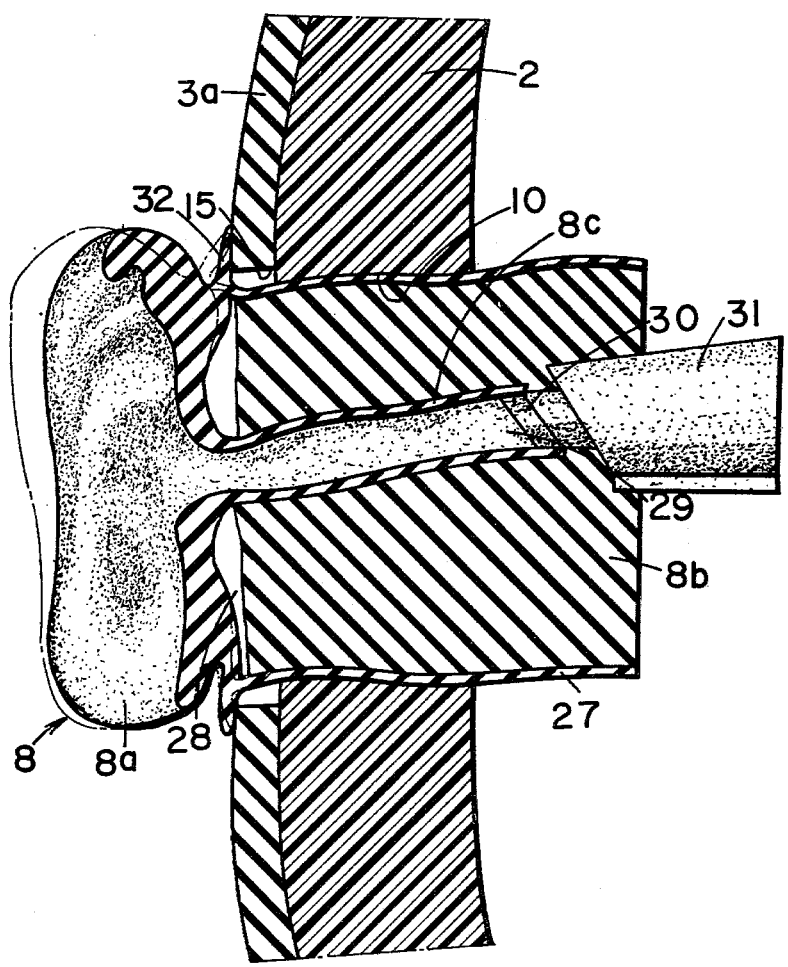

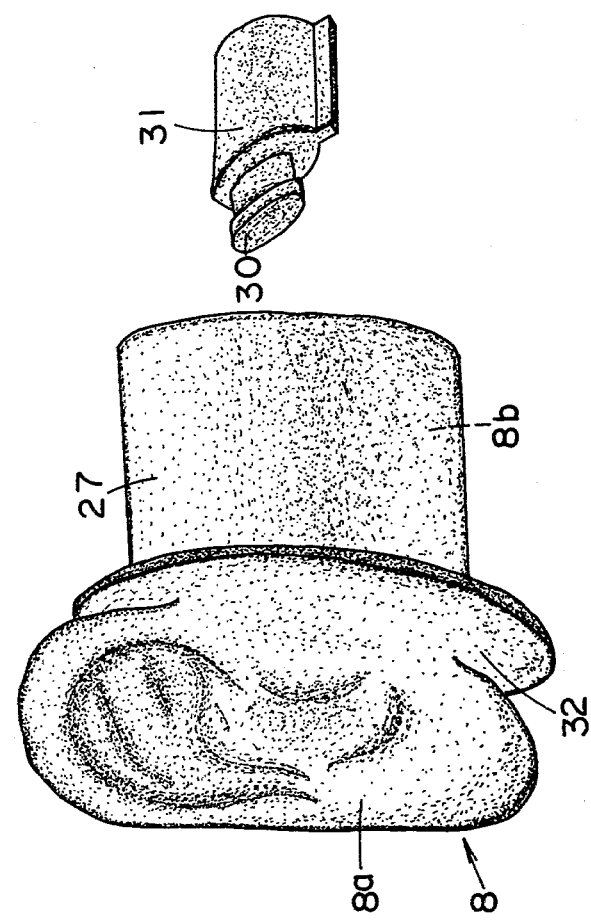

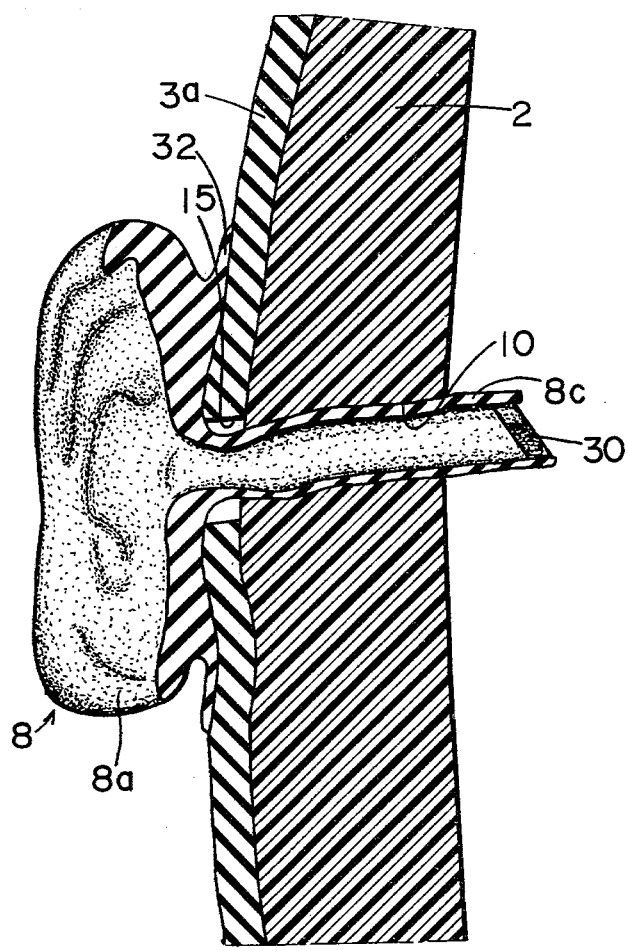

MODEL OF LIVING BODY

BACKGROUND OF THE INVENTION

1. Field of the Invention

This invention relates to a model of a living body, and more particularly to a model of a living body suitable for teaching medical students or interns.

2. Description of the Prior Art

Feature components (ear, tongue etc.) are made of hard resin in a conventional model of the human body which is used for teaching medical students or interns. Compared with the real human body, the conventional model does not give the user a feeling of reality at all.

In an actual medical examination of a patient, for example, the tongue is put out from the mouth in order to observe the inside of the throat, or the concha is so deformed by fingers as to be able to observe the middle ear or operate on the middle ear. However, since the feature components are made of hard resin in the conventional model, for example, the tongue cannot be so put out from the mouth as to observe the inside of the throat, or the concha cannot be so deformed by fingers as to be able to observe the middle ear or operate on the middle ear. Accordingly, for the teaching of the inside of the throat and the middle ear, text books exclusively had to be relied on.

SUMMARY OF THE INVENTION

Accordingly, it is an object of this invention to provide a model of a living body which overcomes the above described defects of the conventional model of the living body.

Another object of this invention is to provide a model of a living body which gives a user a feeling of reality.

A further object of this invention is to provide a model of a living body in which the insides of the organ or feature components can be easily observed.

In accordance with one aspect of this invention, a model of a living body includes a main body; and organ components made of yieldable material, arranged on said main body, wherein an external force is applied to one of the organ components from the external of the main body to deform the organ component, and thereby the inside of the organ component can be observed from the external of the main body.

Various other objects, advantages and features of the present invention will become readily apparent from the ensuing detailed description, and the novel features will be particularly pointed out in the appended claims.

BRIEF DESCRIPTION OF THE DRAWINGS

FIG. 5 is an enlarged longitudinally sectional view of a part of the model of FIG. 1 particularly for explaining the ear portion;

FIG. 6 is an enlarged perspective view of the ear portion in which a holding member with an eardrum is disassembled; and FIG. 7 is an enlarged longitudinally sectional view showing one modification of the ear portion similar to FIG. 5.

DESCRIPTION OF THE PREFERRED EMBODIMENTS

Figure 1:
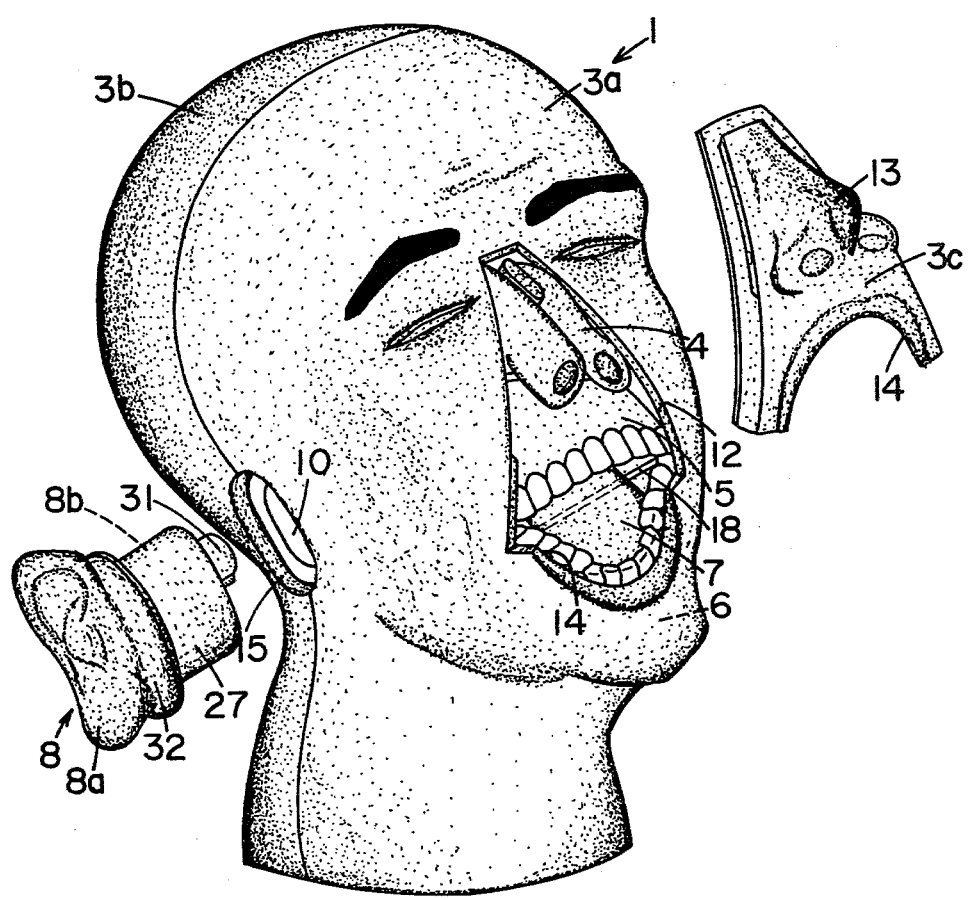
FIG. 1 is a perspective view of a model of the head and neck of the human body according to one embodiment of this invention in which a nose portion and an ear portion are disassembled.

One embodiment of this invention which will be applied to a model of the head and neck of the human body, will be described with reference to FIG. 1 to FIG. 7.

A model 1 of the head and neck of the human body includes mainly a cranium portion 2 as a main body (FIG. 2 and FIG. 3), a front integument portion 3a and a back integument portion 3b. The cranium portion 2 is made of polyester resin. The front and back integument portions 3a and 3b are made of silicone rubber. The cranium portion 2 is covered with the front and back integument portions 3a and 3b.

A front opening 9 is made in the main body 2. At the front opening 9, a nasal fossa portion 4, an upper jaw portion 5, a lower jaw portion 6 and a tongue portion 7 are combined with the main body 2. Side openings 10 are further made in the main body 2. At the side openings 10, ear portions 8 are combined with the main body 2. A pair of pins 23 are formed in the upper jaw portion 5 which may be made of polyester resin and covered with an integument of silicone rubber. The upper jaw portion 5 is fixed at the pins 23 to cut-out portions of the main body 2. A pair of studs 11 are formed on the lower jaw portion 6 which may be made of polyester resin and covered with an integument of silicone rubber. The lower jaw portion 6 is rotatably supported at the studs 11 on cut-out portions of the main body 2. The upper jaw portion 5 and the lower jaw portion 6 cannot be demounted from the main body 2 after combined with the main body 2.

The nasal fossa portion 4, the upper jaw portion 5 and the tongue portion 7, as clearly shown in FIG. 1, are exposed at an opening 12 made in the front integument portion 3a. A nose integument 3c having a nose portion 13, which may be made of silicone rubber, is fitted to the opening 12 of the front integument 3a to cover the nasal fossa portion 4 and the upper jaw portion 5. Thus, a mouth portion 14 is formed in the model 1. The tongue portion 7 is viewed through the mouth portion 14 from the external.

Openings 15 to be aligned with the side openings 10 of the main body 2 are made in the combined front and back integument portions 3a and 3b. The ear portions 8 are inserted through the aligned openings 10 and 15 to be combined with the main body 2. A pipe 26 is embedded in the lower end of the main body 2. A support rod of a stand (not shown) is tightly inserted into the pipe 26 to support the model 1. Characteristic portions of the model 1 according to this embodiment are particularly the tongue portion 7 and the ear portion 8.

Figure 2:
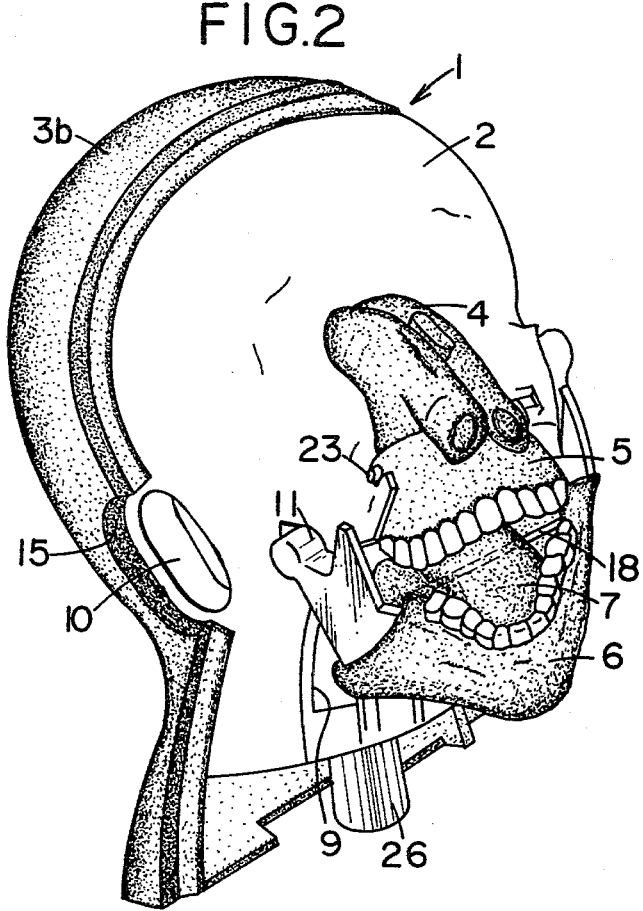
FIG. 2 is a perspective view of the model in which a front integument is removed from the model of FIG. 1.
Figure 3:
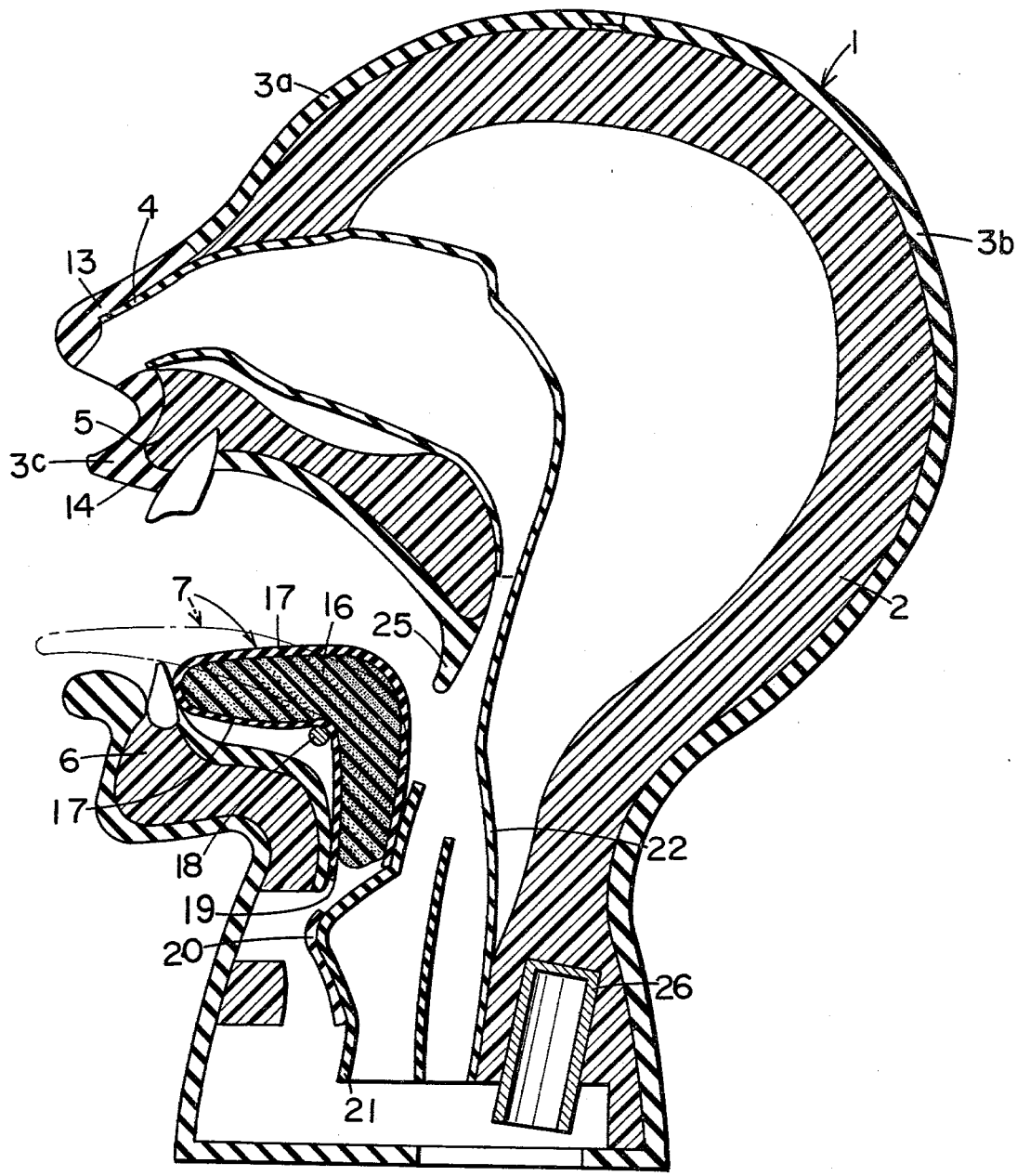
FIG. 3 is a longtudinally sectional view of the model of FIG. 1 particularly for explaining a tongue portion.
Figure 4:
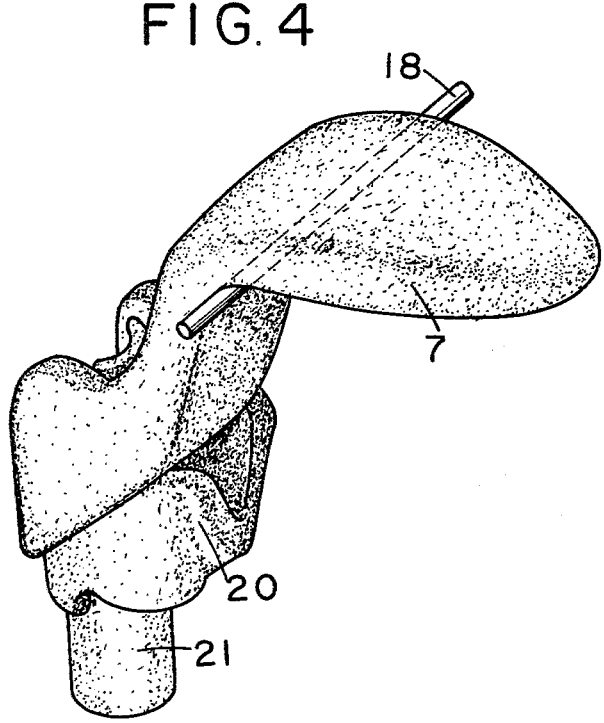
FIG. 4 is a perspective view of the tongue portion of the model of FIG. 1.

First, there will be described the tongue portion 7. As shown in FIG. 3, the tongue portion 7 consists of a yieldable outer layer 17 of silicone rubber and a yieldable inner layer 16 of silicone gel, covered with the outer layer 17. As shown in FIG. 2, a guide rod 18, for example, made of metal, is fixed to the opposite sides of the lower jaw portion 6. The tongue portion 7 is directed toward the mouth portion 14 in contact with the guide rod 18. The rear part of the tongue portion 7 is directed downwardly in a hole 19 made in the main body 2. A trachea portion 21 provided with a thyroid gland portion 20 is disposed adjacent to the rear part of the tongue portion 7. And a throat rear wall portion 22 is so arranged as to surround the trachea portion 21. The tongue portion 7, the trachea portion 21 and the throat rear wall portion 22 may be fixed in the model 1, in different manners. For example, the tongue portion 7 is fixed at one end of the outer layer 17 to the lower jaw portion 6. The trachea portion 21 is fixed to the other end of the outer layer 17 of the tongue portion 7. The throat rear wall portion 22 is integrally formed with the nasal fossa portion 4 which is fixed to the main body 2.

For example, in operation, the top end of the tongue portion 7 is seized by a suitable device, and drawn forward from the mouth 14. As shown by the dot-dash line in FIG. 3, the tongue portion 7 is yieldably deformed to reduce its cross section. As the result, a uvula portion 25 and the neighborhood of the uvula portion 25 in the inside of the mouth 14 can be clearly observed from the external.

When the tongue portion 7 is drawn forward from the mouth portion 14 in the above described manner, the tongue portion 7 is smoothly guided by the guide rod 18. Accordingly, the tongue portion 7 can be easily deformed as shown by the dot-dash line in FIG. 3, merely by pulling the top end of the tongue portion 7. The operation is simple. The drawn tongue portion 7 can be stably held on the guide rod 18. When the tongue portion 7 is released from the device, the tongue portion 7 is restored to its original shape as shown by the solid line in FIG. 3.

The above-described elastic deformation and restoration of the tongue portion 7 gives the user a feeling of reality, and allows the user to clearly observe the interior of the throat portion from the exterior. A conventional model of the head and neck of the human body did not allow a user to observe the interior of the throat portion from the exterior. Accordingly, the model according to this embodiment is superior as a teaching material.

The tongue portion 7 and the trachea portion 21 may be so designed as to be demountable from the main body 2. In such a case, the interior of the throat portion or neck portion can be more widely observed from the exterior by demounting the tongue portion 7 and trachea portion 21.

Next, there will be described the ear portion 8.

As shown in FIG. 5 and FIG. 6, the ear portion 8 includes mainly a concha portion 8a made of soft silicone rubber and an ear holding portion 8b made of hard silicone rubber. The concha portion 8a and the ear holding portion 8b are so covered with an integument 27 of soft silicone rubber as to be combined with each other and to leave a slight space 28 between them. A piercing hole is made as an external auditory miatus or middle ear portion 29 in the center of the ear holding portion 8b. A tubular portion 8c extending from the center of the concha portion 8a is fixed to the piercing hole of the ear holding portion 8b to form the middle ear portion 29. A holding member 31 provided with an eardrum 30 is inserted into the middle ear portion 29 of the ear holding portion 8b from the inside of the main body 2. In the assembling step of the model 1, the ear holding portion 8b of the ear portion 8, to which the holding member 31 with the eardrum 30 is fitted, is inserted into the opening 15 of the combined front and back integuments 3a and 3b and the side opening 10 of the main body 2 aligned with each other, as shown in FIG. 1 and FIG. 5. The diameter of the ear holding portion 8b is nearly equal to the diameter of the side opening 10 of the main body 2. Accordingly, the ear holding portion 8b is tightly fitted to the side opening 10 of the main body 2. Since a flange 32 of the concha portion 8a contacts with the integuments 3a and 3b, the ear holding portion 8b is restrained from being further inserted.

In operation, for example, the yieldable concha portion 8a is pulled backward by fingers substantially in the direction normal to the plane of the drawing. Accordingly, the concha portion 8a is so deformed as shown by the dot-dash line in FIG. 5. In such a condition, an applicator can be easily inserted into the middle ear portion 29 without hindrance of the concha portion 8a. Further, the inside of the middle ear portion 29 can be easily observed from the exterior. When the concha portion 8a is released from the fingers of the user, it is restored to its original shape as shown by the solid line in FIG. 5.

The above-described elastic deformation and restoration of the concha portion 8a of the ear portion 8 gives the user a feeling of reality. Further, the holding member 31 with the eardrum 30 can be demounted from the ear holding portion 8b of the ear portion 8. Accordingly, in the lesson of the surgical operation of the eardrum, the incised eardrum 30 of the holding member 31 is demounted from the ear holding portion 8b, after the surgical operation, and the incised condition of the eardrum 30 can be observed in detail outside of the model 1. That is very convenient.

FIG. 7 shows one modification of the ear portion 8 of the above-described embodiment. Parts in this modification which correspond to the parts in FIG. 1 to FIG. 6, are denoted by the same reference numerals. In this modification, the ear holding portion 8b and the holding member 31 are omitted. The tubular portion 8c of the ear portion 8 is attached directly to the main body 2. The flange 32 of the concha portion 8a is fixed to the integuments 3a and 3b, for example, with adhesive. The eardrum 30 is fitted to the top end of the tubular portion 8c. It may be fixed to the top end of the tubular portion 8c. A small space is formed at the opening 15 between the tubular portion 8c and the integuments 3a and 3b. In operation, the concha portion 8a is deformed in the manner shown in FIG. 5. Further, the tubular portion 8c can be spread at the opening 15 by the inserted applicator, since the small space is formed at the opening 15.

While there has been described a preferred embodiment of this invention, obviously further modifications and variations are possible in light of the above teachings. It is therefore to be understood that within the scope of the appended claims, the invention may be practised otherwise than as specifically described.

For example, although the nose portion 13 is fitted to the opening 12 of the front integument portion 3a in the above embodiment, it may be formed integrally with the front integument 3a or the main body 2. The front and back integuments 3a and 3b may be fixed to the main body 2 with adhesive, and further may be formed integrally with each other. In any case, the nose portion can be deformed in the similar manner to the tongue portion and ear portion.

In the above embodiment, the top end of the tongue portion 7 is pulled out from the mouth 14 by the suitable device in order to observe the inside of the throat. However, the tongue portion 7 may be pushed downward at the upper surface by a suitable device in order to observe the inside of the throat, in the same manner as in the actual examination of a patient.

Further, although the above embodiment is applied to the model of the head and neck of the human body, this invention may be applied to a model of any other organs of the human body, or to a model of any other living body than the human body.

Further, although the organ components such as the tongue portion and the ear portion are individually manufactured in the above embodiment, they may be formed integrally with the main body. In such a case, they may be thinner formed than the main body.

What is claimed is:

1. In an anatomical model including a main body comprising a hollow cranium portion, a mouth opening, a lower jaw portion, and a tongue portion located within said cranium portion inside of a mouth portion of said main body, the inner end of said tongue portion being attached to said lower jaw portion, the improvement wherein said tongue portion comprises a yieldable outer layer of silicone rubber and a yieldable inner body of silicone gel covered with said outer layer, a transversely extending guide rod attached to said cranium portion adjacent said lower jaw, said tongue portion extending upwardly from said lower jaw and outwardly over said guide rod toward said mouth opening whereby when an external force is applied to said tongue portion by grasping the outer end of said tongue, said tongue portion is yieldably deformed to reduce its cross section and is slideably guided by said guide rod, whereby said tongue portion and interior cranium portions can be observed from the exterior of said cranium portion.

2. A model according to claim 1 including an ear portion comprising a concha portion and a tubular portion formed integrally with said concha portion, said tubular portion being inserted into an opening of said main body and fixed to said main body.

3. A model according to claim 1 including a nose portion fixed to said main body.

4. A model according to claim 1, in which said main body is covered with at least one integument portion.

5. A model according to claim 4, in which said main body comprises polyester resin, and said integument portion comprises silicone rubber.

* * * * *